Jan. 7, 1958   V. PICARD ET AL   2,818,964
APPARATUS FOR THE CONTROLLED FEEDING OF
CARTRIDGE CASES AND OTHER ARTICLES
Filed May 31, 1955   10 Sheets-Sheet 10
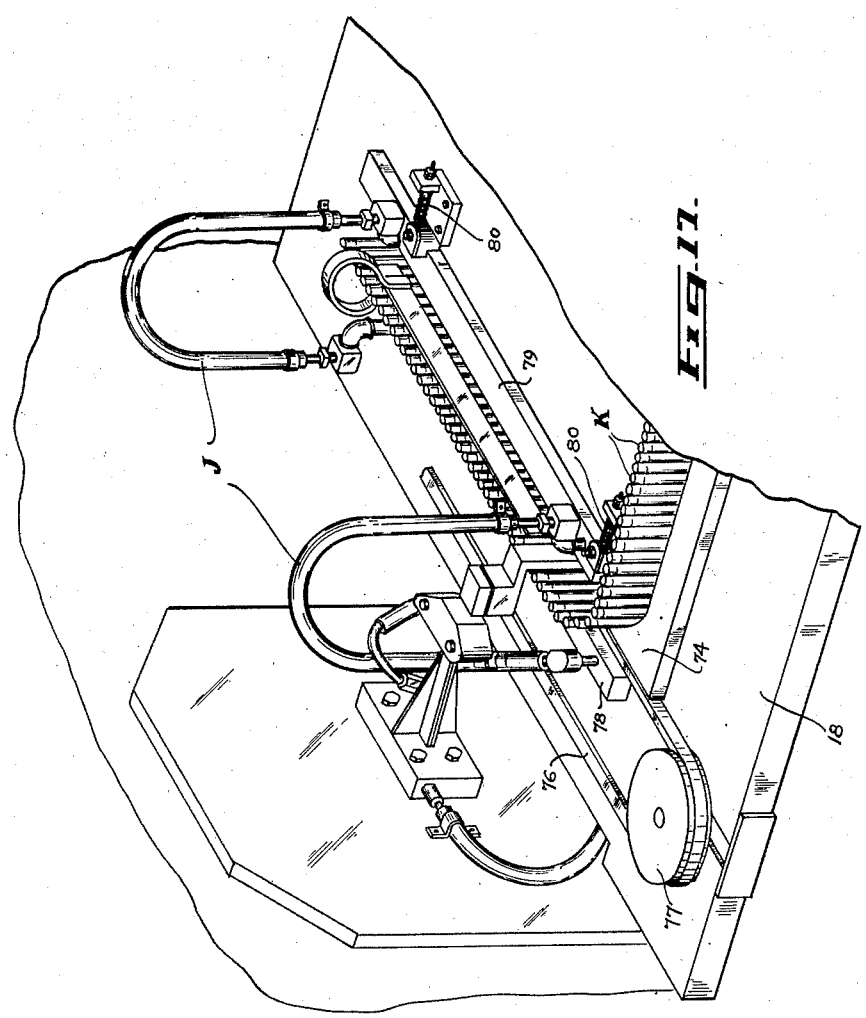

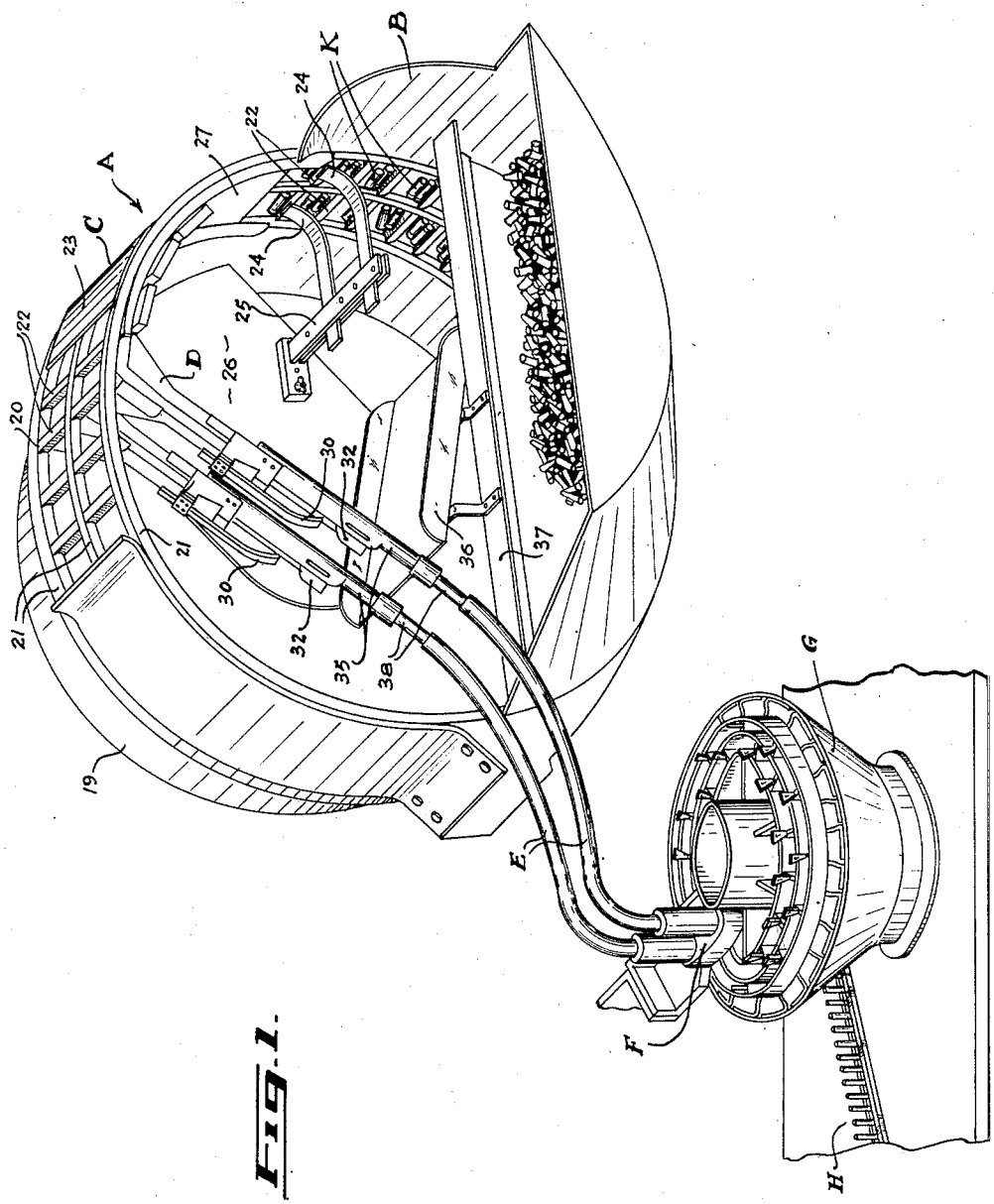

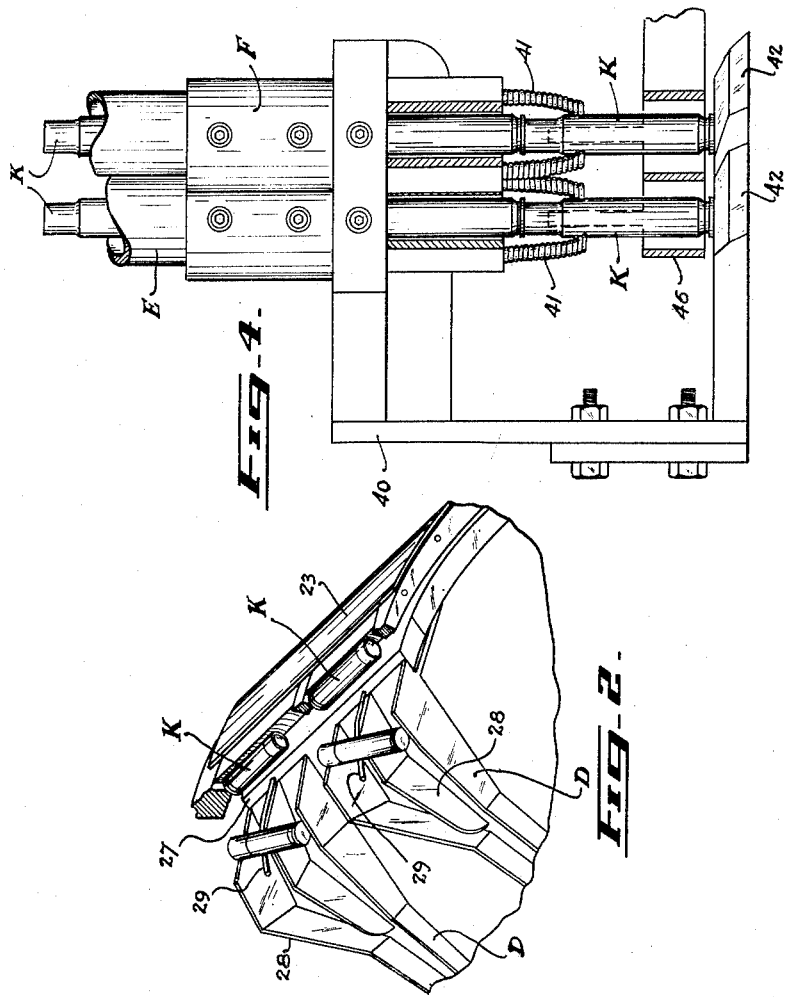

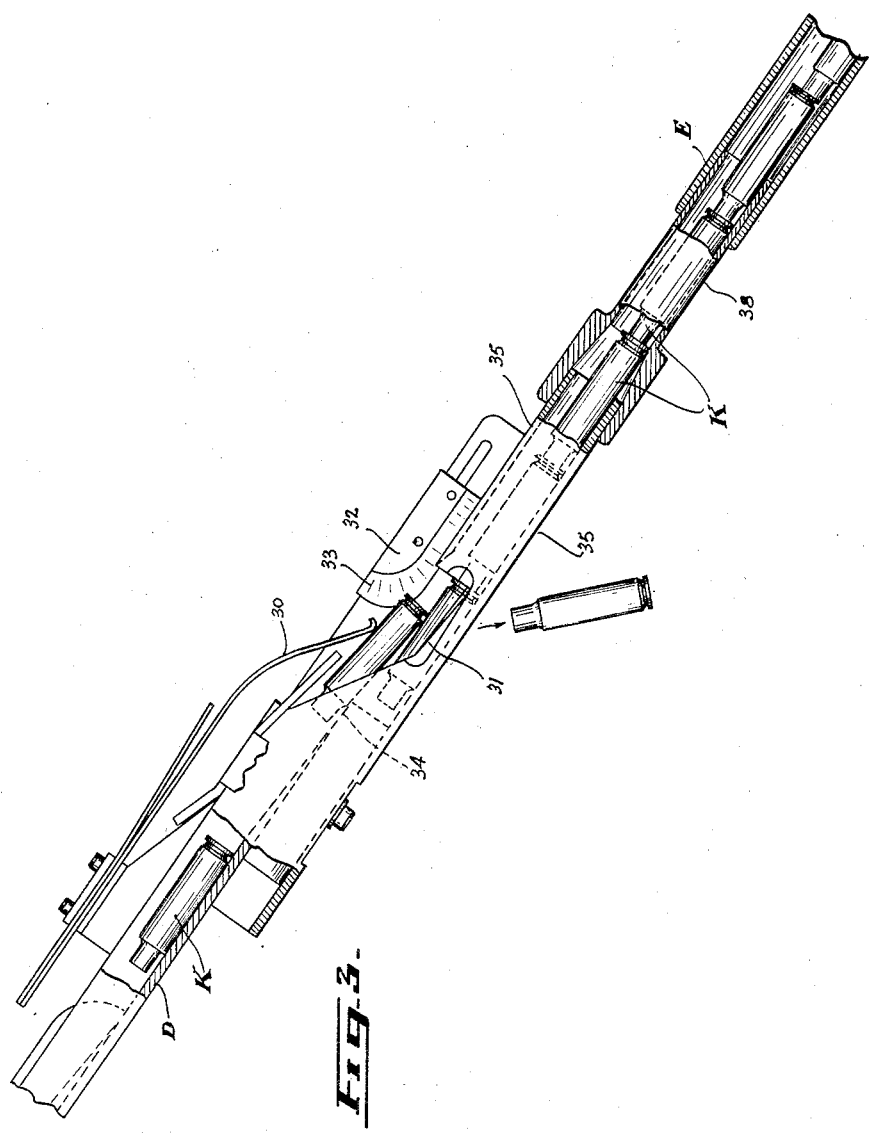

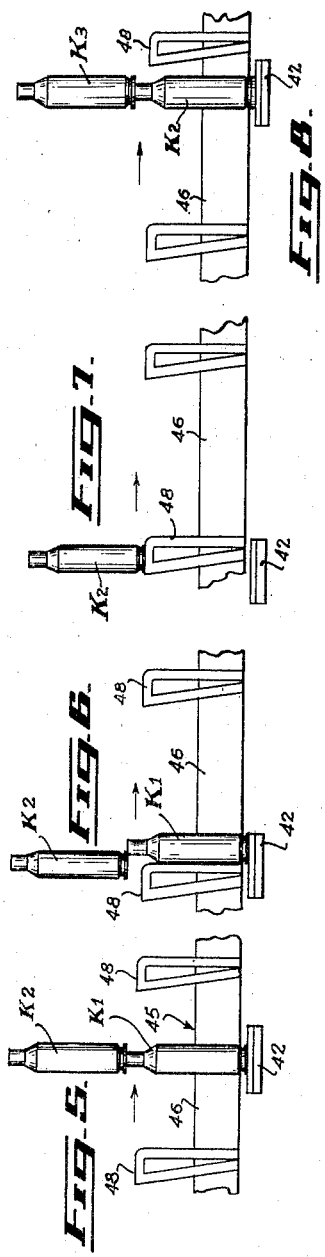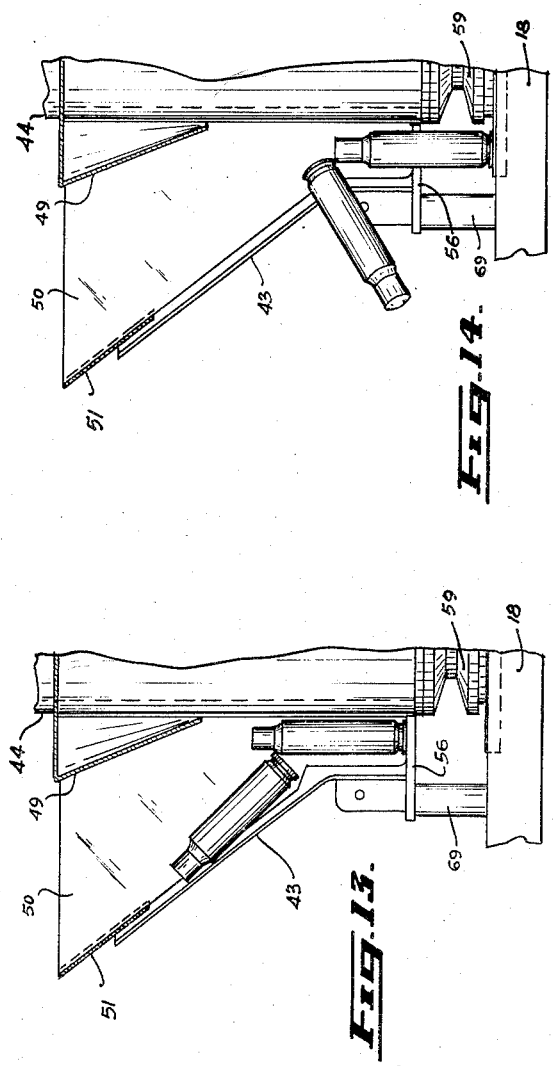

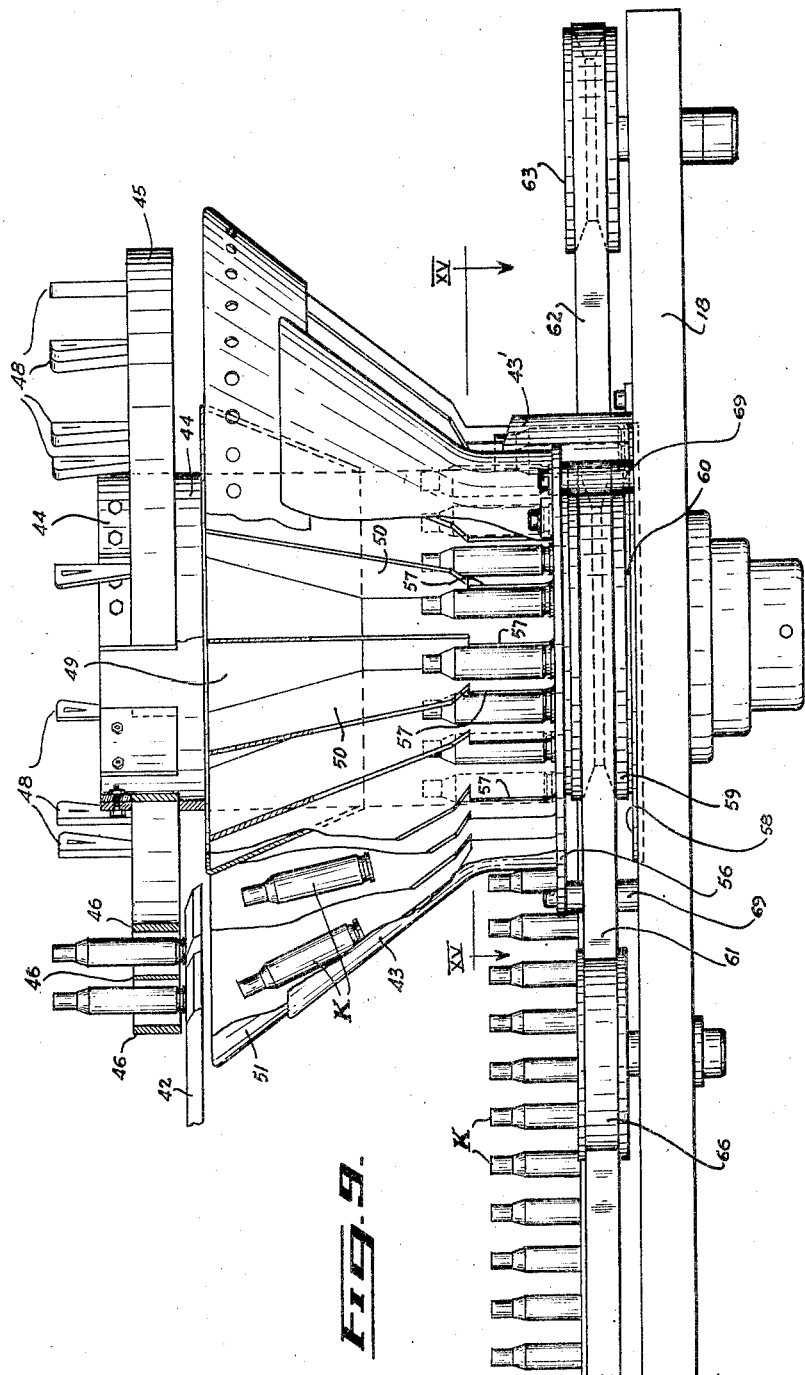

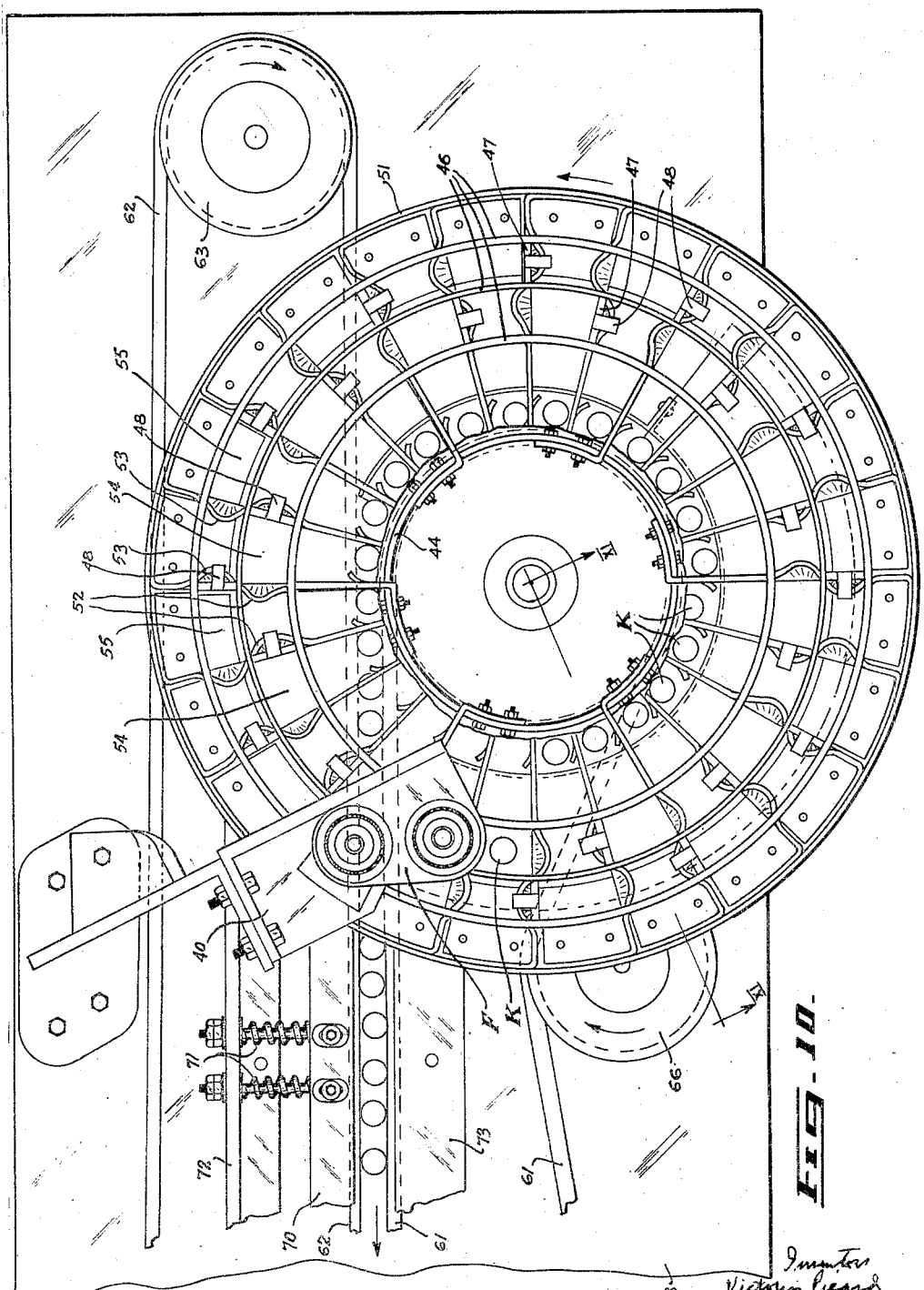

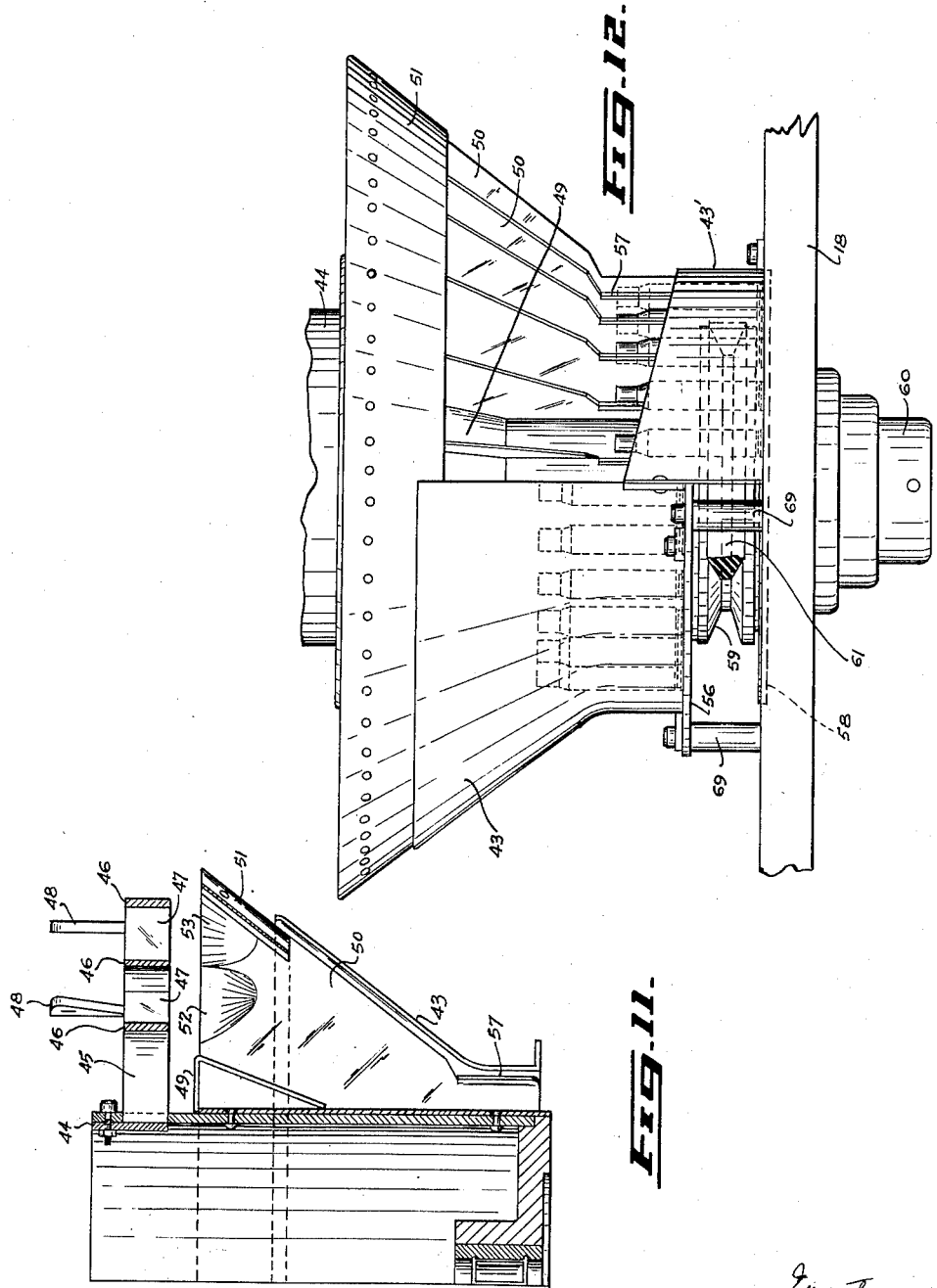

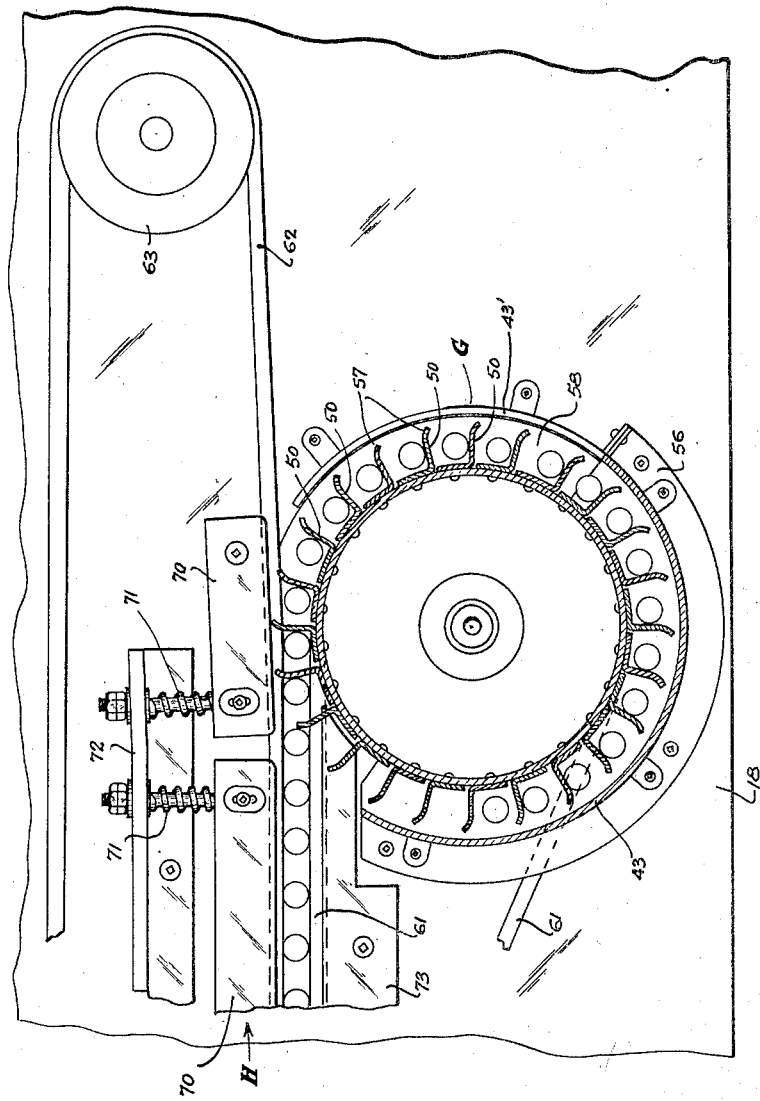

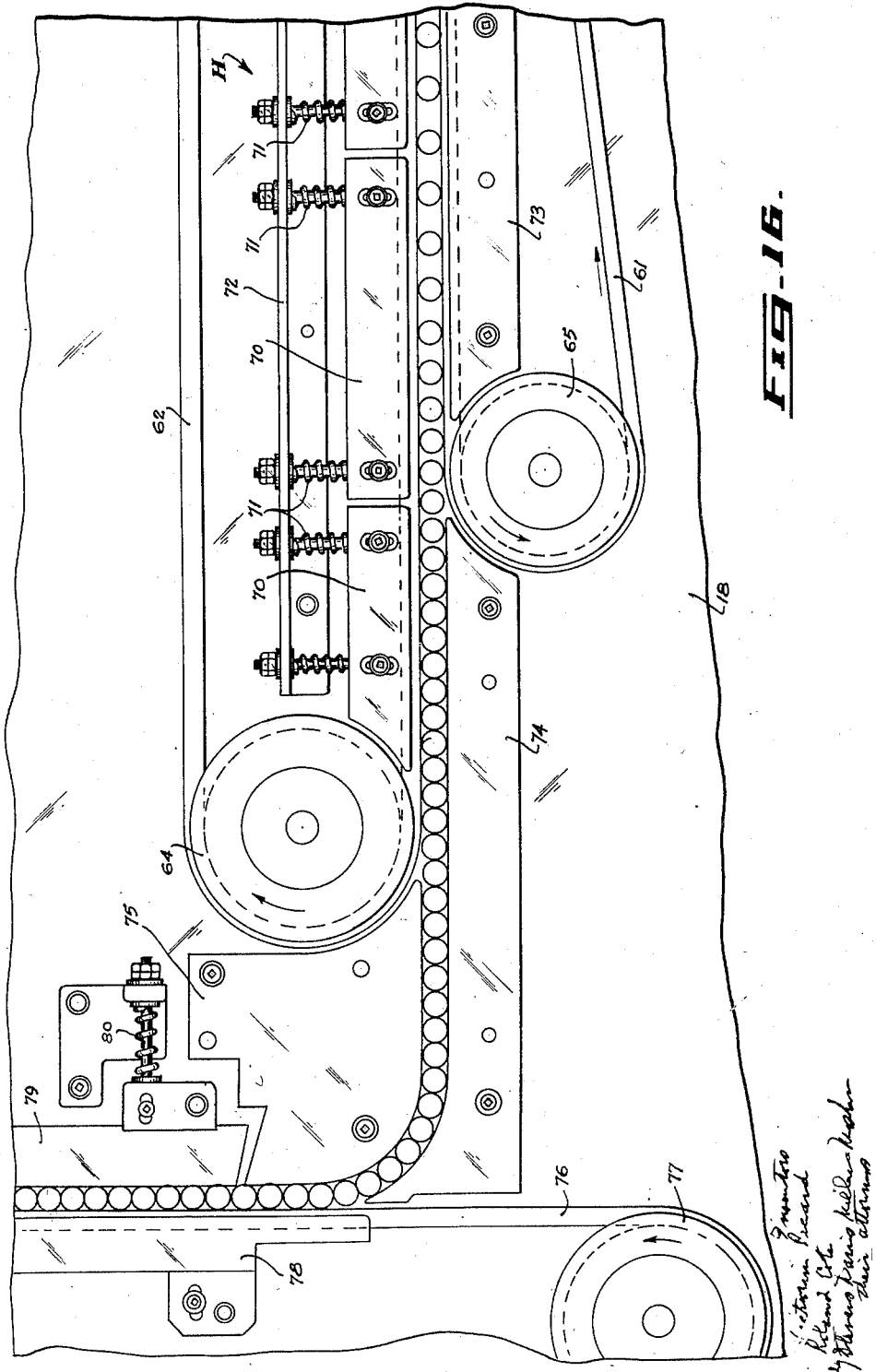

United States Patent Office 2,818,964
Patented Jan. 7, 1958

2,818,964

APPARATUS FOR THE CONTROLLED FEEDING OF CARTRIDGE CASES AND OTHER ARTICLES

Victorin Picard and Roland Cote, Quebec, Quebec, Canada, assignors to Canadian Arsenals Limited, Ottawa, Ontario, Canada, a company under the Government Companies Operation Act Application May 31, 1955, Serial No. 512,038

3 Claims. (Cl. 198—32)

This invention relates to apparatus for the controlled feeding of elongated, generally cylindrical, asymmetrically longitudinally weighted articles, especially cartridge cases, in connection with the feeding of which the invention will be exemplified. It is particularly concerned with the provision of a moving uniform series of closely spaced cartridge cases disposed with their major axes extending transversely to the direction of such movement.

It is necessary in the manufacture of cartridges to subject the empty cartridge cases to an annealing operation before filling them. Annealing machines for this purpose are already well known, and the present improvements relate to apparatus for feeding cartridge cases to such machines, the object of the invention being to ensure an especially even and regular flow of the cartridge cases.

In its preferred form, the invention consists of a machine for providing a moving uniform series of closely spaced symmetrically disposed cartridge cases or other articles of the type described above extending with their major axes transverse to the direction of such movement, said machine comprising hopper means for storing a number of said cartridge cases, guide means for feeding said cartridge cases seriatim along a path in a direction transverse to their major axes with random orientation of the ends of said cartridge cases, a narrow elongated member extending in the direction of travel of the cartridge cases and disposed to receive the same from said guide means and to underlie each of said cartridge cases centrally of its length, a pair of surfaces arranged below and one on each side of said member to receive the cartridge cases as they fall head foremost therefrom, a narrow tube for the reception of said cartridge cases and having an internal diameter less than twice the maximum external diameter of a cartridge case, narrow guide means for conveying the cartridge cases orientated by said elongated member from said surfaces to the mouth of said tube, a distributor comprising a platform arranged beyond the discharge end of said tube to receive and support each cartridge case discharged therefrom, means disposed around said discharge end adapted lightly to engage each said cartridge case to maintain the same erect on said platform, a fixed, generally conical, downwardly tapering casing and within said casing a central rotatable hub member to which are secured a plurality of upwardly extending fingers each adapted to engage a cartridge standing on said platform and to propel it beyond the edge thereof and projecting radially from said hub member a series of circumferentially spaced partitions each adjacent pair of which forms with the hub member and the fixed casing a generally convergent cavity for receiving and retaining erect a cartridge case caused to fall thereinto by one of said fingers, a fixed arcuate plate underlying said partitions to support the heads of cartridge cases received in said cavities, said plate extending around only a minor portion of said distributor, a circumferential flange member extending outwardly from said rotatable hub member and underlying said plate to support the heads of cartridge cases in said cavities impelled beyond the end of said plate by said partition, a pulley forming part of said hub member and disposed above said flange member, an endless belt extending around a portion of said pulley along a straight path and back to said pulley, said pulley being arranged so that said belt presents its outer face to the peripheral surfaces of the cartridge cases supported by said flange member, a second endless belt disposed to converge with the first said belt in the vicinity of the point where said first belt extends tangentially away from said pulley, the casing of the distributor serving to define said cavities being interrupted at such point to permit the cartridge cases to move outwardly of the distributor to the space between the belts, means for resiliently urging said belts together to maintain a friction grip on the cartridge cases, means for supporting the heads of said cartridge cases propelled by the belts beyond the edge of said flange member, and drive means for rotating said hub member and said belts.

The invention also consists of certain parts of such machine operating independently of the remaining parts.

Apparatus in accordance with the preferred form of the invention is illustrated in detail in the accompanying drawings, in which:

Figure 1 shows a general perspective view of the principal parts of the apparatus, namely a hopper unit, a distributor and slides and feeding tubes connecting these units;

Figure 2 shows on a larger scale a fragment of the hopper unit and slides seen in Figure 1;

Figure 3 shows, also on a larger scale, a partly sectional view of one slide and its feed tube;

Figure 4 shows a front elevation of the distributor head;

Figures 5, 6, 7 and 8 are diagrammatic views respectively illustrating a sequence of steps in the operation of the distributor;

Figure 9 shows a general front elevation, partly cut away, of the distributor (without the distributor head) and a part of the conveyor assembly;

Figure 10 is a plan view of the distributor seen in Figure 9;

Figure 11 is a fragmentary central section of the distributor taken on the line XI—XI in Figure 10 and with the lowermost part omitted;

Figure 12 is a part side-part front elevation of the lower part of the distributor, as seen from the right of Figure 9;

Figure 13 is a diagrammatic cut-away fragment of the distributor illustrating a position that two cartridge cases may occupy;

Figure 14 is a view similar to Figure 13 illustrating these two cartridge cases at a later stage in their movement around the distributor;

Figure 15 is a section on the line XV—XV of Figure 9;

Figure 16 is a view of the conveyor assembly to which the cartridge cases are fed by the distributor; and Figure 17 is a perspective view of a part of the conveyor assembly and the inductor to which the cartridge cases are fed by said assembly.

In view of the complexity of the apparatus, the detailed description of the parts will be preceded by a short general description of the apparatus as a whole and its function.

With reference to Figure 1, it will be seen that the apparatus includes a hopper unit A which consists of a hopper B and a drum assembly C. The manufactured cartridge cases waiting to be annealed are thrown into the hopper B and are carried upwardly in the drum assembly C to be discharged down slides D from whence they travel outwardly through feed tubes E to a distributor head F. This latter is shown in detail in Figure 4 and will be more fully described later. From this distributor head F the cartridge cases are drawn into the distributor G from whence they are discharged into a conveyor assembly H (see Figures 1, 15 and 16). The cartridge cases are carried along in this guide assembly by moving belts and are ultimately fed through an inductor J shown in Figure 17. This inductor J will be a machine of known type operating in accordance with well known electro-induction principles. It is preferred to employ a machine of the type manufactured by the Ohio Crank Shaft Company and marketed under the trade name TOCCO. It is most important that the supply of cartridge cases to machines of this type should be regular, so that the cases will pass through the inductor both regularly spaced and without interruption, since the occurrence of a single empty space is sufficient to have an effect on the ultimate hardening of approximately forty cases. An empty space might go unnoticed by the operator, with the result that defective work would be mixed with good work, necessitating the testing of all individual cases. It might even lead to the rejection of a whole batch of cartridge cases, which normally numbers 150,000 cases. This makes clear the importance of obtaining regularity of feeding, it being primarily the distributor G in the present apparatus that is responsible for the attainment of such regularity. The hopper unit A, slides D and tubes E serve to provide a continuous supply of cartridge cases orientated with their heads, that is to say the closed ends, leading.

The hopper unit A consists, as already mentioned, of a hopper B and a drum assembly C. The drum assembly C consists of a cylindrical housing 19 in which a framework 20 is rotatably mounted. This framework 20 consists of three axially spaced annular members 21, interconnected at frequent and regular intervals by a series of cupped bars 22 approximately equal in length to a cartridge case. At the righthand side of the drum assembly C as shown in Figure 1, these cupped bars 22 co-operate with a plate 23 forming the periphery of the drum assembly, to provide a series of pockets in which cartridge cases K can be retained and elevated. It will be evident that as the framework 20 is rotated within the drum assembly, the bars 22 will engage cartridge cases thrown into the hopper B, the bottom of which communicates with the lower part of the drum assembly. These cartridge cases will thus be drawn upwardly along the side of the drum assembly, as shown in Figure 1. Any cartridge cases tending to project outwardly from the pockets formed by the bars 22 will come into engagement with one of a pair of wiping fingers 24 as they travel upwardly on the righthand side of the drum assembly C, thus to be deflected back into the bottom of such assembly. Normally only one cartridge case will remain in the cavity of each bar 22 after the wiping fingers 24 have been passed, although a second cartridge case may remain balanced on top of the first one for a short time: if so, it will soon fall back into the hopper as the plate 23 curves inwardly. The wiping fingers 24 are secured to a bracket 25 which in turn is fixed to a plate 26 which is stationary within the drum assembly C. To avoid cartridge cases falling out of the pockets formed between the bars 22 and the plate 23, once a half-way point has been reached on the side of the drum assembly C, an inside plate 27 is also provided. The cartridge cases impelled by the bars 22 will thus continue to move upwardly of the drum assembly C in the annular space defined by the plates 23 and 27. Finally, the cartridge cases reach a point adjacent the top of the drum assembly where they are discharged into one of a pair of slides D, as best seen in Figure 2. Each of these slides D is initially of a width comparable with the length of a cartridge case K, and is provided centrally with a partition 28 extending for a short portion of its length. Such partitions 28 each have a rod 29 extending along the top thereof. Each cartridge case K as it emerges from the drum assembly C and falls beyond the end of the plate 27, rolls onto one or other of the rods 29, these rods being positioned to underlie the centre of each cartridge case. Since the head ends of the cartridge cases will be heavier than the mouth ends, each case will tend to topple off a rod 29 in whichever direction it is tilted by the weight of its head. This action is seen in Figure 2 and results in every cartridge case sliding down the slides D head first, regardless of the random orientation of the cartridge cases in the drum assembly C. Beyond the ends of the partitions 28, the slides D narrow to a width less than the length of the cartridge cases K so that they cannot turn around in the slides.

These slides feed the cartridge cases to a pair of feed tubes E. The transfer from each slide D to a tube E is accomplished within the assembly shown on a larger scale in Figure 3. Throughout the whole apparatus emphasis is placed on obtaining a supply of cartridge cases following closely one behind the other, and for this reason it is arranged that the capacity of the drum assembly C is such that the rate of feeding of cartridge cases down the slides D is somewhat greater than that required by the distributor G, the details of which will be described below. This allows for any temporary interruption in the flow of cartridge cases up the drum assembly. It follows that at some point it will be necessary to reject certain cartridge cases and return them to the main supply at the bottom of the drum assembly C. The assembly shown in Figure 3 accomplishes this object. It will be observed that the slide D is not exactly co-axial with its feed tube E, the slide D being slightly higher while similarly downwardly inclined. As the cartridge cases K travelling down the slide D pass beyond the lower end 34 of such slide, they come into engagement with a spring finger 30 which presses them downwardly into the mouth of a tube 35 co-axial with and feeding into the tube E. Each such case comes to lie in the tube 35 with its head against the mouth of the preceding cartridge case, this situation being clearly shown on the right-hand part of Figure 3. At this stage it may be mentioned that the function of the distributor G is such that individual cartridge cases will be withdrawn from the far ends of the tubes E intermittently. Each time a cartridge case is withdrawn, the entire series of cases in each tube E will move along by the length of a cartridge case, thus providing space for a further cartridge case to be added at the beginning of the series. Since, however, more cartridge cases will travel down the slides D than are required by the distributor G, cases will arrive at the spring fingers 30 while there is still no space for such cases in the mouth of the tubes 35. It is important to avoid jamming when this happens and for this reason a recess 31 is provided in the outside of each of the slides D where they merge into the mouths of the tubes 34. These recesses 31 each act in conjunction with an ejector plate 32 positioned just above the mouth of the tube 34. Each such ejector plate 32 has an outwardly inclined bevelled surface 33 which, when the head of an unwanted cartridge case bears against it, deflects such cartridge case outwardly of the assembly through the space provided by the recess 31. Such an ejected cartridge case is shown falling from the assembly in Figure 3 another being in the process of ejection. Ejected cartridge cases will strike an inclined tray 36 (see Figure 1) secured to the fixed plate 26 and to a bar 37 extending across the lower part of the hopper unit A between the drum assembly C and the hopper B. The feed tubes E are each preferably provided with a telescopic intermediate portion 38, between the tube 35 and the mouth of the tube E, to allow for adjustments in the relative positions of the hopper unit A and distributor G.

For convenience of illustration on one sheet, the tubes E in Figure 1 are shown extending almost horizontally for a part of their length. It is to be understood that in practice sufficient slope will always be maintained in these tubes to ensure the proper flow of the cartridge cases.

At the far end of the feed tubes E, the cartridge cases K enter a distributor head F which is arranged in a fixed position above the distributor G by means of a supporting bracket 40. Details of these parts are seen in Figure 4, the disposition of the head F above the distributor being best appreciated from the plan view of Figure 10. In the head F, each tube E terminates in a plurality of spring bushings 41, forming, in effect, constricted yieldable extensions of such tubes. These spring bushings 41 serve to maintain a cartridge case K erect after the same has fallen from the end of a tube E onto a narrow slightly sloping platform 42 extending outwardly from the supporting bracket 40 into position beneath the ends of each of the tubes E. This action is clearly shown in Figure 4.

To appreciate the method by which the cartridge cases are moved from this position, it is first necessary to consider the construction of the distributor G with particular reference to Figures 9, 10, 11 and 12. This distributor has a fixed semi-conical casing 43 firmly mounted on the base plate 18 of the machine. Within and protruding upwardly from this conical casing 43 is a rotatably mounted central cylinder 44. Secured to the top of this cylinder 44 is a framework 45 consisting of three concentric annular bands 46 interconnected at intervals by webs 47. The webs 47 are arranged in two concentric series, the first series interconnecting the intermediate and outer bands 46 and the second series interconnecting the intermediate and inner bands 46. Each web 47 carries an upstanding finger 48, one series of webs 47 being circumferentially staggered from the other series.

The action of these fingers 48 on the cartridge cases standing on the platform 42 is illustrated in the series of diagrammatic views, Figures 5, 6, 7 and 8. In these views the distributor head F has been omitted. As the framework 45 rotates, a finger 48 comes to bear with its vertical leading edge against a cartridge case K, and thus forces such cartridge case off the platform 42. This operation is illustrated in Figure 6. The situation a moment later is illustrated in Figure 7, the first cartridge case K1 having been moved off the edge of the platform 42 to fall into the lower part of the distributor, with the next cartridge case K2 in the end of the tube E then resting on the flat top of the finger 48. Finally, as illustrated in Figure 8, when the finger 48 has passed beyond alignment with the tube E, the cartridge case K2 will fall down onto the platform 42 and remain in an erect position by reason of the grip of the bushings 41 awaiting the next finger 38. The next cartridge case K3 in the tube E will then move down and rest with its head against the mouth of the cartridge case K2 standing on the platform 42.

The lower part of the distributor G is completed by a series of radially extending, circumferentially spaced plates 50 secured to the rotatable cylinder 44 and to a conical facing member 49 surrounding the cylinder 44. The upper outer edges of these plates 50 are interconnected by an annular strip 51 which is closely overlapped by the upper edge of the conical casing 43, the plates 50 being shaped to define a conical envelope, i. e. so that their edges lie adjacent the inner surface of the casing 43, as best seen from Figure 11. Such plates thus serve to form a number of compartments within the distributor G. When deflected by the fingers 48, the cartridge cases fall one into each of these compartments and are thus caused to migrate around the distributor G as the cylinder 44 is rotated. At their upper edges, each of the plates 50 is formed with a pair of oppositely bowed portions 52 and 53. The vertical extent of these portions is best appreciated from Figure 11, while their shape in plan view may be seen from Figure 10. It will be observed that each bowed portion of any one plate is arranged in the opposite sense to the corresponding bowed portion of the next adjacent plate. Also, for any one plate 50 the bowed portion 52 is dished in the opposite sense to the bowed portion 53, so that two concentric series of staggered funnels 54 and 55 are obtained, each such funnel being positioned immediately below and before a finger 48 so that cartridge cases deflected thereby will fall from the platform 42 into one of such funnels 54 and 55. One cartridge case K is thus fed to each space between a pair of plates 50 from one or other of the tubes E. The radial displacement between the funnels 54 and 55 appears only at the top of the distributor, the cartridge cases on reaching the lower part of the distributor being confined each in a relatively small space, the bottoms of such spaces being defined by an arcuate plate 56 secured to the fixed conical housing 43 and, in fact, serving to secure the housing 43 to the base of the apparatus by pillars 69. Since the plate 56 does not rotate, the heads of the cartridge cases are caused to slide along its surface by reason of their confinement in the spaces between the moving plates 50.

It will be seen from Figures 12 and 15, that after each cartridge case has moved about 120° around the distributor G it arrives at the end of the arcuate plate 56 and drops down onto a disc 58 which is secured to the underside of a pulley 59 secured to the lower part of the cylinder 44, this assembly being mounted on a shaft 60 (Figure 9) that is freely rotatable in the base plate 18 of the machine. The pulley 59 has a V-shaped groove to receive a V-belt 61 which extends, as best seen in Figures 10 and 15, around a major portion of such pulley 59 so as to present its outer face to the cylindrical surfaces of the cartridge cases K which have dropped down onto the disc 58. The cartridge cases K continue to move around the distributor G being impelled both by the lower parts of the plates 50 and the disc 58 and retained by a fixed plate 43' secured to the plate 43, until they reach the rear of the distributor G where the belt 61 extends tangentially away from the pulley 59 beyond the end of the plate 43'.

The operation, should two cartridge cases by chance fall into one of the spaces formed between the plates 50, is clearly seen from Figures 13 and 14. The former figure shows the situation before the end of the arcuate plate 56 is reached, the second and unwanted cartridge case lying against the fixed outer casing 43 since the lower part of each space formed between the plates 50 is too small to accommodate more than one cartridge case. At the point where the end of the arcuate plate 56 is reached and the first cartridge case drops down onto the disc 58, the casing 43 also terminates being continued at a lower level by the plate 43' which has been omitted from Figure 14 for clarity. The upper cartridge case is then free to fall outwardly, as shown by the latter figure. Further appreciation of how this action will take place can be gained from consideration of the front view of the part of the distributor where the casing 43 terminates and the plate 43' begins, shown in Figure 12.

A second belt 62 which passes around an idler pulley 63 (Figures 9, 10 and 15) and a driven pulley 64 (Figure 16) is arranged to extend parallel to the tangential portion of the belt 61, whereby these two belts form the operative part of the conveyor assembly H by engaging opposite peripheral surfaces of each of the cartridge cases K. It will be noted that the lower outer edges of the plates 50 are bent slightly backwards to form lips 57 which facilitate passage of the cartridge cases K from the spaces formed between the plates 50 into the conveyor assembly (see Figure 15). The belt 62 is pressed towards the belt 61 to confine the cartridge cases tightly therebetween, by means of pressure blocks 70, grooves being provided in the face of these pressure blocks 70 in which the belt 62 can slide. Springs 71 extend between the rear surfaces of the blocks 70 and a fixed bracket 72 to provide the necessary force urging the belt 62 towards the belt 61, the latter being firmly backed up by a fixed block 73 similarly provided with a grooved face to receive the belt 61. This latter belt 61 passes around a driven pulley 65 (Figure 16) to extend back to the pulley 59 via an idler pulley 66 (Figures 9 and 10).

As seen in Figure 16, when the cartridge cases K pass beyond the pulley 65, they are supported against the pressure of the blocks 70 by means of a fixed block 74. A short distance further on, the belt 62 is also withdrawn from contact with the cartridge cases being returned around the pulley 64. The cartridge cases K then continue to travel between two fixed blocks, namely the block 74 and a further block 75, their forward motion being maintained by the pressure of further cartridge cases at the rear.

As seen from Figures 16 and 17, the direction of travel of the cartridge cases K is changed through 90° by curved surfaces on the blocks 74 and 75 so that such cartridge cases can be fed through the inductor J for annealing purposes. To ensure positive feeding of the cartridge cases through this inductor J, a third endless belt 76 is provided extending around a driven pulley 77 and a further pulley (not shown). This belt 76 slides in a grooved face of a fixed block 78, the other sides of the cartridge cases K being urged against this belt by a movable block 79 acted on by springs 80. The construction and operation of the inductor J is entirely conventional and no detailed description will therefore be furnished. The distributor G is not directly driven through its shaft, the power being supplied at the belt driving pulleys 64, 65 and 77 and the distributor being driven through its pulley 59 from the belt 61.

The rate of drive of the conveyor belt 61 will be rather faster than that of the belts 62 and 76. The cartridge cases are fed from the distributor at a uniform rate and are positioned between the belts 61 and 62 with uniform spacing. The effect of the faster travel of the belt 61 will be to rotate each cartridge case slightly clockwise about its own longitudinal axis. This situation continues until the pulley 65 is reached (see Figure 16). Beyond the pulley 65 and before the pulley 64, the cartridge cases are subjected to the movement of only the belt 62, since on their other sides they are pressed against the fixed block 74. This also has the effect of rotating each cartridge case about its longitudinal axis, although in the anti-clockwise direction, as seen in Figure 16, instead of the clockwise rotation produced by the co-operation of the belts 61 and 62. Moreover, this method of propulsion of the cartridge cases has the effect of closing the gaps between the cases until they lie closely against one another, since the linear forward speed of any one cartridge case between the pulleys 65 and 64 is less than before they reach the pulley 65, i. e. when this linear speed was the mean of the speeds of the belts 61 and 62. This reduction of speed is made just sufficient to be equivalent to the required reduction in spacing of the cartridge cases. This close abutting relationship of the cartridge cases is maintained beyond the pulley 64, when the movement of the cartridge cases becomes purely linear as they slide between the blocks 74 and 75 under the pressure of the cartridge cases behind them. Finally, the cartridge cases come into contact with the belt 76, the speed of which is the same as that of the belt 62. The belt 76 causes some clockwise rotation of the cartridge cases while maintaining them in their close abutting relationship for feeding through the inductor J.

We claim:

1. A distributor for receiving a series of downwardly moving closely spaced cartridge cases or other elongated, generally cylindrical, asymmetrically longitudinally weighted articles with the heavier end foremost from a substantially vertical tube and for re-orientating said articles as a moving series of closely spaced symmetrically disposed articles extending with their major axes transverse to the direction of such movement, said distributor comprising a platform arranged beyond the discharge end of said tube to receive and support each article discharged therefrom, means disposed around said discharge end adapted lightly to engage each said article to maintain the same erect on said platform, a fixed, generally conical, downwardly tapering casing and within said casing a central rotatable hub member to which are secured a plurality of upwardly extending fingers each adapted to engage an article standing on said platform and to propel it beyond the edge thereof and projecting radially from said hub member a series of circumferentially spaced partitions each adjacent pair of which forms with the hub member and the fixed casing a generally convergent cavity for receiving and retaining erect an article caused to fall thereinto by one of said fingers, a fixed arcuate plate underlying said partitions to support the heads of articles received in said cavities, said plate extending around only a minor portion of said distributor, a circumferential flange member extending outwardly from said rotatable hub member and underlying said plate to support the heads of articles in said cavities impelled beyond the end of said plate by said partitions, a pulley forming part of said hub member and disposed above said flange member, an endless belt extending around a portion of said pulley along a straight path and back to said pulley, said pulley being arranged so that said belt presents its outer face to the peripheral surfaces of the articles supported by said flange member, a second endless belt disposed to converge with the first said belt in the vicinity of the point where said first belt extends tangentially away from said pulley, the casing of the distributor serving to define said cavities being interrupted at such point to permit the articles to move outwardly of the distributor to the space between the belts, means for resiliently urging said belts together to maintain a friction grip on the articles, means for supporting the heads of said articles propelled by the belts beyond the edge of said flange member, and drive means for rotating said hub member and said belts.

2. A distributor for receiving a series of downwardly moving closely spaced cartridge cases or other elongated, generally cylindrical, asymmetrically longitudinally weighted articles with the heavier end foremost from a substantially vertical tube and for re-orientating said articles as a moving series of closely spaced symmetrically disposed articles extending with their major axes transverse to the direction of such movement, said distributor comprising a platform arranged beyond the discharge end of said tube to receive and support each article discharged therefrom, means disposed around said discharge end adapted lightly to engage each said article to maintain the same erect on said platform, a fixed, generally conical, downwardly tapering casing and within said casing a central rotatable hub member to which are secured a plurality of upwardly extending fingers each adapted to engage an article standing on said platform and to propel it beyond the edge thereof and projecting radially from said hub member a series of circumferentially spaced partitions each adjacent pair of which forms with the hub member and the fixed casing a generally convergent cavity for receiving and retaining erect an article caused to fall thereinto by one of said fingers, a circumferential flange member extending outwardly from said rotatable hub member to support the heads of articles in said cavities, a pulley forming part of said hub member and disposed above said flange member, an endless belt extending around a portion of said pulley along a straight path and back to said pulley, said pulley being arranged so that said belt presents its outer face to the peripheral surfaces of the articles supported by said flange member, a second endless belt disposed to converge with the first said belt in the vinicity of the point where said first belt extends tangentially away from said pulley, the casing of the distributor serving to define said cavities being interrupted at such point to permit the articles to move outwardly of the distributor to the space between the belts, means for resiliently urging said belts together to maintain a friction grip on the articles, means for supporting the heads of said articles propelled by the belts beyond the edge of said flange member, and drive means for rotating said hub member and said belts.

3. A distributor as claimed in claim 1, wherein said fixed casing of the distributor has an upper portion thereof cut away at a point displaced circumferentially from the part of the casing below said platform whereby to provide an outlet for any article in one of said cavities not standing on said flange member.

References Cited in the file of this patent

UNITED STATES PATENTS

| | | | |
|---|---|---|---|
| 736,622 | Olin | Aug. 18, | 1903 |
| 1,333,006 | Welser | Mar. 9, | 1920 |
| 2,264,468 | Alexander | Dec. 2, | 1941 |
| 2,355,100 | Nordquist | Aug. 8, | 1944 |
| 2,385,618 | Ekstrand | Sept. 25, | 1945 |
| 2,415,198 | Webb | Feb. 4, | 1947 |
| 2,572,164 | Lehmann | Oct. 23, | 1951 |
| 2,629,483 | Schweiter | Feb. 24, | 1953 |
| 2,679,313 | Gueffroy et al. | May 25, | 1954 |